(12) United States Patent
Slaski

(10) Patent No.: US 7,298,867 B2
(45) Date of Patent: Nov. 20, 2007

(54) COMPONENT ASSOCIATION TRACKER SYSTEM AND METHOD

(75) Inventor: James Slaski, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 504 days.

(21) Appl. No.: 10/781,641

(22) Filed: Feb. 20, 2004

(65) Prior Publication Data
US 2005/0185822 A1   Aug. 25, 2005

(51) Int. Cl.
*G06K 9/00* (2006.01)
(52) U.S. Cl. .................................................. 382/103
(58) Field of Classification Search ................ 382/103
See application file for complete search history.

(56) References Cited

U.S. PATENT DOCUMENTS

| | | | |
|---|---|---|---|
| 3,586,770 A | 6/1971 | Bonebreak | |
| 4,739,401 A | 4/1988 | Sacks et al. | |
| 4,910,786 A * | 3/1990 | Eichel | 382/199 |
| 4,942,533 A * | 7/1990 | Kakinami et al. | 701/225 |
| 5,075,875 A | 12/1991 | Love et al. | |
| 5,103,484 A | 4/1992 | Stafford et al. | |
| 5,233,541 A | 8/1993 | Corwin et al. | |
| 5,283,839 A | 2/1994 | Edelman et al. | |
| 5,323,987 A * | 6/1994 | Pinson | 244/3.16 |
| 5,335,298 A * | 8/1994 | Hevenor et al. | 382/199 |
| 5,341,435 A | 8/1994 | Corbett et al. | |
| 5,390,133 A | 2/1995 | Sohie | |
| 5,434,927 A * | 7/1995 | Brady et al. | 382/104 |
| 5,555,312 A * | 9/1996 | Shima et al. | 382/104 |
| 5,657,251 A | 8/1997 | Fiala | |
| 5,751,831 A * | 5/1998 | Ono | 382/103 |
| 5,761,326 A * | 6/1998 | Brady et al. | 382/103 |
| 5,762,292 A * | 6/1998 | Schweyer et al. | 244/3.17 |
| 5,872,857 A * | 2/1999 | Chodos et al. | 382/103 |
| 5,911,004 A | 6/1999 | Ohuchi et al. | |
| 5,940,538 A * | 8/1999 | Spiegel et al. | 382/236 |
| 6,075,875 A | 6/2000 | Gu | |
| 6,265,704 B1 * | 7/2001 | Livingston | 250/203.2 |
| 6,323,987 B1 * | 11/2001 | Rinaudo et al. | 359/260 |
| 6,445,832 B1 * | 9/2002 | Lee et al. | 382/266 |
| 6,480,615 B1 * | 11/2002 | Sun et al. | 382/103 |
| 6,901,110 B1 * | 5/2005 | Tsougarakis et al. | 375/240.12 |
| 6,993,158 B2 * | 1/2006 | Cho et al. | 382/103 |
| 7,110,602 B2 * | 9/2006 | Krause | 382/199 |
| 2005/0265582 A1 * | 12/2005 | Buehler et al. | 382/103 |

OTHER PUBLICATIONS

Eu-Wei Huang, Wei-Guan Yau, and Li-Chen Fu, "An Edge Based Visual Tracking for Target within Complex Enviroment", Jun. 2000, pp. 1993-1997, Proceedings of the American Control Conference.*
"An Edge Based Visual Tracking for Target within Complex Environment", En-Wei Huang, Wei-Guan Yan, Li-Chen Fu, Proceedings of the American Control Conference, Jun. 2000.

* cited by examiner

*Primary Examiner*—Matthew C. Bella
*Assistant Examiner*—Tom Y Lu
(74) *Attorney, Agent, or Firm*—Birch, Stewart, Kolasch & Birch, LLP

(57) ABSTRACT

A component association tracker is disclosed. The tracker detects, identifies and tracks a target or targets using components extracted from an image. The tracker extracts the components from a window in the image according to edge directions of connected pixels. The tracker associates the components with existing tracks from a track file. The tracks are updated according to information from the associated components.

12 Claims, 4 Drawing Sheets

COMPONENT ASSOCIATION TRACKER SYSTEM AND METHOD

FIELD OF THE INVENTION

The present invention relates to a system and method for tracking an object (target) in a sequence of images by tracking the individual components of the object and individual components of the surrounding imagery (clutter). A user may designate particular components as the target to be tracked while other components are considered clutter. For subsequent received images, the components are associated with existing target and clutter markers (tracks) in an efficient manner to provide the target position.

BACKGROUND OF THE RELATED ART

Recognizing targets is a challenge to existing detection systems. A function of automatic target recognition is to find candidate targets and to separate them from clutter which commonly includes target detection, classification, and identification. Another related function is to track identified targets by updating target information (e.g., target position) over time. Tracking targets using image data is accomplished by using known processes to recognize data pixels associated with received images (broken down into individual components) of the tracked target. Conventional detection and tracking systems analyze images for pixel distortion to determine a difference to separate the background or clutter from an established or new target.

For example, target tracking in fire control and missile seeker applications locate potential targets in high background clutter areas and track the potential targets. Several problems can occur in target tracking. One problem is accomplishing target acquisition and tracking in real time. Processing requirements, especially for image data, can be large so as to prevent timely updates of the target environment. Different environments, targets, and background also pose difficulties. A target tracking system should be flexible and sophisticated enough to accomplish real time image processing.

Another problem involves eliminating potential loss-of-lock, or loss of track, of identified targets that occur in high background clutter areas. The background can be cluttered with objects of various shapes and sizes. The components derived from these objects interfere with tracked target components. Further, discrimination between true and false targets is problematic in high background clutter. Thus, target tracking systems strive to reduce the effect of background clutter and to improve target identification and tracking.

Conventional target trackers use image correlation to update target position and direction. These trackers analyze image data to determine an updated position and direction of the track target. Conventional trackers, however, can suffer from input error and from problems with image processing that impede target tracking. For example, a global shift can occur in a received target image from a previous target image. An association algorithm for a conventional target tracker does not account for this global shift, and established targets are improperly tracked. Data derived from the image can be associated with the wrong target in a multi-target tracker. Global shift problems also can be common in missile and other airborne seeker applications that change directions, altitude, flight paths, speed and the like.

Received images also are filtered and processed using conventional methods to detect components that are associated with tracked targets. Problems occur, however, when peaks of energy of the component pixels are not so readily identified compared with the background or clutter. Further, the derived components may not be readily associated with an established target, or a new target. These efforts waste processing resources. Thus, conventional target tracking systems suffer from identification and tracking errors or inefficient tracking that wastes resources. Moreover, the inability to identify targets against high background clutter impede the effectiveness of detection and tracking systems.

SUMMARY OF THE INVENTION

Accordingly, the disclosed embodiments of the present invention are directed to a component association tracking system and method that reduce the problems associated with the conventional tracking systems described above. The disclosed embodiments of the present invention enhance tracking of established and new targets while efficiently utilizing processing resources.

According to one exemplary embodiment of the present invention, a method for tracking a target in an image is disclosed. The target is associated with an image component marker (track) defined as a target track. The method includes extracting at least one component from a received image, within a search window established in the image, according to an edge direction of connected pixels within the component. The window may be a predetermined search window associated with an estimated target position. The method also includes selecting the component to update the track according to the association. The method also includes updating the track with the edge direction of the component.

Additional features and advantages of the present invention are set forth in the description that follows and, in part, will be implied by the description or can be learned from practice of the invention. The objectives and other advantages of the invention are realized and attained by the structure and methods particularly pointed out in the written description and the claims, as well as the appended drawings.

BRIEF DESCRIPTION OF THE DRAWINGS

The accompanying drawings, which are included to provide a further understanding of the disclosed embodiments of the present invention, illustrate the invention and, together with the description, serve to explain the principles of the invention. In the drawings.

DETAILED DESCRIPTION OF THE PREFERRED EMBODIMENTS

Figure 1:
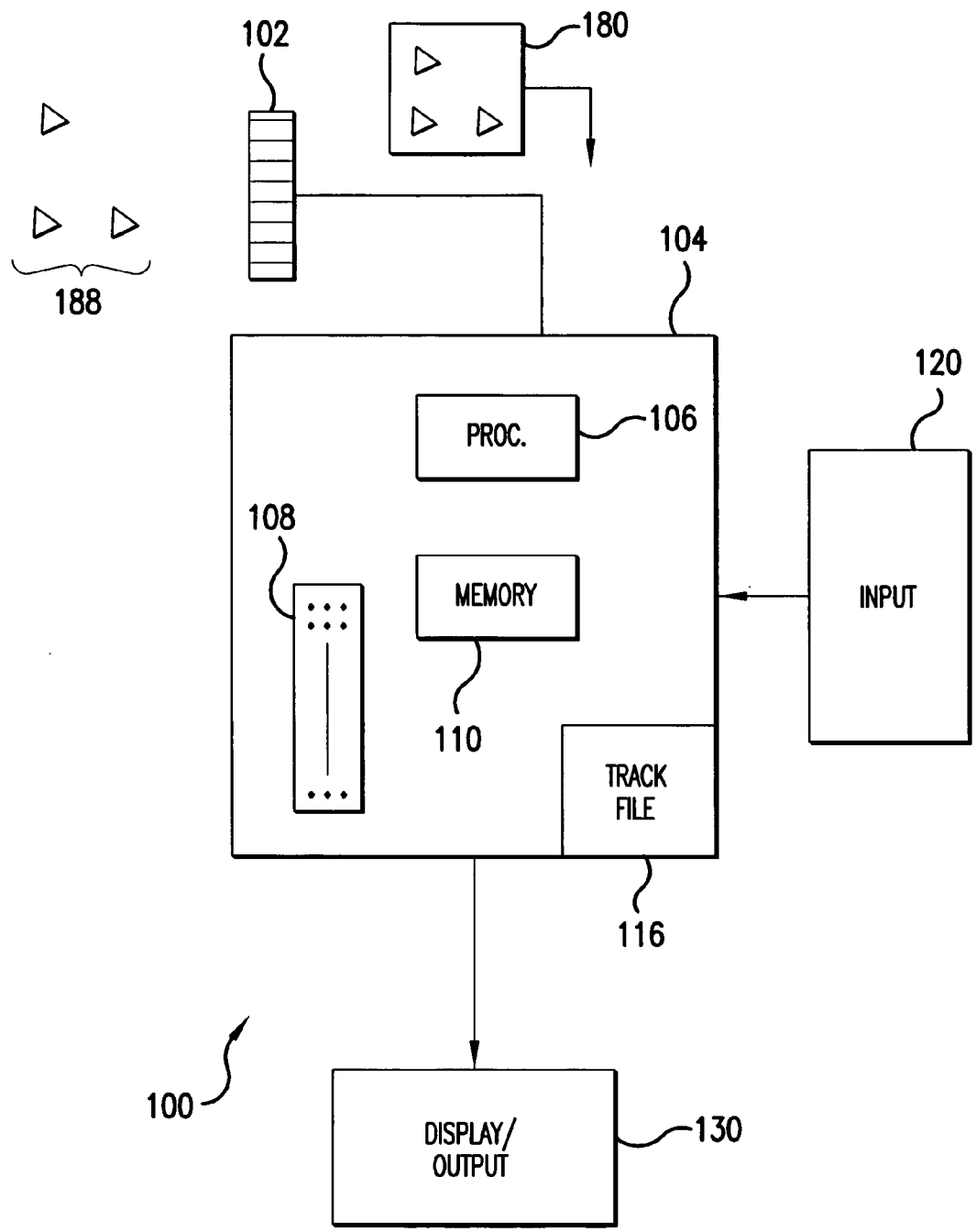
FIG. 1 illustrates a detection and tracking system according to embodiments of the present invention.

FIG. 1 depicts a target detection, identification and tracking system 100 according to embodiments of the present invention. Detection system 100 detects and tracks candidate targets and any other objects of interest. Detection system 100 operates in any environment, and preferably operates on an airborne platform that seeks, detects, identifies and tracks targets in the air, on the ground, on water, under water, and the like. More preferably, detection system 100 is configured within a missile seeker that detects and tracks targets.

Detection system 100 includes detectors 102 that receive information from the environment and detect candidate targets 188. The information includes radiant flux for infrared detection, or any other energy detectable by detectors 102. Alternatively, detectors 102 can receive electromagnetic or radio frequency energy. Using known processes, detectors 102 and any accompanying hardware and software generate an image 180. Image 180 includes image data regarding targets 188. Detectors 102 are any known detectors, such as infrared detectors, radar detectors, a camera or cameras, sensors, or any device capable of capturing data regarding targets 188 for a certain area. Detectors 102 are coupled directly or indirectly to tracker 104.

Tracker 104 receives image 180. Tracker 104 can refine or perform processing operations on image 180. Preferably, image 180 contains any information regarding potential candidate targets. More preferably, image 180 comprises pixels. Each pixel can have different characteristics, such as brightness, color, contrast, and the like. Image 180 includes one or more targets which may be tracked such as targets 188. Targets which are being tracked, such as targets 188, are received as a sequence of images 180. The sequence of images 180 including the target object 188 may be broken down into a plurality of individual image components as well as the surrounding imagery (clutter). Tracker 104 tracks the locations of the individual components for these by associating the components with existing image component markers, referred to as tracks, that are stored in a track file 116. Track file 116 can include three types of tracks (image component markers), discussed in greater detail below.

Tracker 104 includes processor 106, memory 110, and instructions 108. Processor 106 executes instructions 108 to perform functions for tracker 104. Preferably, instructions 108 are software code used to execute a software program stored on tracker 104. Instructions 108 can be stored in memory 110 to perform operations on tracker 104. Alternatively, instructions 108 may reside in another source within or coupled to tracker 104. Processor 106 performs computations, actions, and other functions to track targets identified in image 180 according to instructions 108.

Instructions 108 guide the operations of tracker 104. Instructions 108 include instructions to identify components within image 180, and to perform any of the processes disclosed below. Instructions 108 also include instructions for other functions executable on tracker 104.

Specifically, tracker 104 processes or analyzes image data within image 180. The results help predict the position of a target, such as targets 188. The positions of tracks, associated with targets and non-targets, also are predicted. Tracker 104 breaks up potentially interesting pieces of image 180 for further consideration according to the predicted positions. The potentially interesting pieces are referred to as "components". A target, along with surrounding clutter, is broken up into multiple components within image 180. A target/clutter detection method similar to the method disclosed in commonly assigned U.S. patent application Ser. No. 10/465,723, filed on Jun. 20, 2003, which is hereby incorporated by reference and entitled "TARGET DETECTION SYSTEM USING TRAINED AND UNTRAINED DETECTION AND METHODS THEREFOR", may be used.

All of the identified components are tracked individually through a track/component association process executed on processor 106 that attempts to find an optimal match between the existing tracks and the components identified from image 180. The tracking of individual components within image 180, rather than the entire image (or target image) allows for flexible constraints to be placed on the tracking operations of tracker 104.

The tracking by tracker 104 is based on segmenting image 180 into small edge components. A target, as well as one or more clutter objects, within image 180 that is being tracked may be segmented into a plurality of individual components. The locations of individual components may be tracked using existing tracks (image component markers) stored in track file 116 on tracker 104. The image component markers (tracks) stored in track file 116 may have been generated using individual components previously segmented from received image 180.

Track file 116 preferably includes of three types of tracks. Non-established tracks are tracks that have been in existence for a short period of time and can be caused by spurious components not associated with a target, such as clutter or background. Established tracks have been in existence for at least a specified minimum amount of time and have been associated with received components consistently. Target tracks are a subset of established tracks and have position coordinates relative to a target being tracked. Additional types of tracks may be included in track file 116.

Preferably, to initiate a target track, on the first frame of an image sequence the user or other entity designates a rectangular region that contains the target or regions that contain targets. This region may be segmented into image components that are designated as the target and may be used to create "established", target tracks. All other image components, outside of the rectangular region, may be designated as clutter and may be used to create "established", non-target tracks. Preferably, this process is only used on the first frame of the received image 180. Alternatively, the rectangular region may be automatically designated via an algorithm or preset conditions. Target initialization allows the track file to be initialized from a "start" position. If more than one target is applicable, then a plurality of rectangular regions are created.

Further, processor 106 can determine when a non-established track should be converted into an established track, and when an established track should be converted into a target track. In addition, processor 106 facilitates the identification and generation of new tracks by using received components within image 180 that are not associated with existing tracks. Memory 110 stores information regarding target tracks identified by tracker 104.

Tracker 104 continually predicts the updated position of a target using individual image components segmented from received image 180. Initially for the first received image frame 180, tracker 104, in response to user selection, establishes a target track and non-target tracks from segmented components from received image 180 which are stored in track file 116. For future received image frames 180, tracker 104 uses linear prediction to predict the position of stored, non-target tracks in the current received image frame 180 based on each track record, in the track file 116, including the track's position in pixels relative to the target center, and the velocity of the track in pixels per frame. Also, the target track is fixedly positioned relative to the target center (normalized to the target size) allowing prediction of the target position from the prediction of the target track position or vice versa. Track file 116 can be stored in memory 110. Alternatively, track file 116 is stored in another memory location, or even another storage medium, such as a disk, portable memory, mobile device, and the like.

After predicting of target position and non-target track positions, image components may be extracted/identified from the received image 180 around the predicted target position. Preferably, the extracted components are associated with established tracks that have the same edge direction, and fall within a search window (e.g., rectangular) around the predicted track position in received image 180. Preferably, the search window may be sized large to account for target movement and changes in the size of the field of view (FOV) from the motion (frame-by-frame) of sensors being used by detectors 102.

From the received image 180, tracker 104 extracts and produces a plurality of components that may be potentially associated with an established track including determining the best one-to-one association, or global optimization, between tracks and components identified from image 180. Tracker 104 uses final track-to-component pairings to update the established tracks and to predict current position of target 180.

The updated established tracks and target positions are communicated to a user or any other entity via display/output 130. Display/output 130 can be any device, medium, means, system, component or the like that is able to display or output target identification, detection, or track information. Display/output 130 may be a display monitor coupled to tracker 104. For an exemplary missile application where the tracker 104 is used to detect, track, and destroy opposition missiles, tracker 104 may feed the output to a missile autopilot to control the flight path of the missile without requiring use of a display.

Any components that have not been associated with established tracks are associated with non-established tracks by tracker 104. Preferably, tracker 104 uses a simple nearest-neighbor association that searches over a smaller area than the previous established track correlation within image 180. If any components are unused after the second association step, new non-established tracks are created from these non-associated components identified in image 180. Tracker 104 then performs track file maintenance including deleting old tracks, and promoting tracks to established or target status in accordance with specified criteria. These features are disclosed in greater detail below.

Input 120 also is coupled to tracker 104 to allow data input or interface with a user or other entity. Tracker 104 can be modified or constrained according to system requirements/specifications or user-defined requirements/specifications. Input 120 can be any device, medium, means, or system that allows the input of data or requirements/specifications to tracker 104. For example, a user inputs instructions to further define operations on processor 106 using input 120. In this example, input 120 is a keyboard attached to a computer executing instructions 108 to detect, identify and track targets using tracker 104. For an exemplary missile application, data input may come from a missile launcher interface where data is transmitted from pilot controls.

Thus, tracker 104 is a component association tracker according to the disclosed embodiments of the present invention that receives image 180 for detecting and tracking targets 188. Tracker 104 segments image 180 into components based on the edge direction of groups of connected pixels within image 180.

Tracker 104 also includes logic that controls how the target and clutter appearance is allowed to change. This logic is controlled by processor 106 and instructions 108. Further, instructions 108 may include an algorithm that can be adjusted to balance performance of target tracker 104 versus processor load on processor 106. Thus, tracker 104 enables dynamic target detection, classification, identification and tracking according to specified requirements and parameters.

Figure 2A:
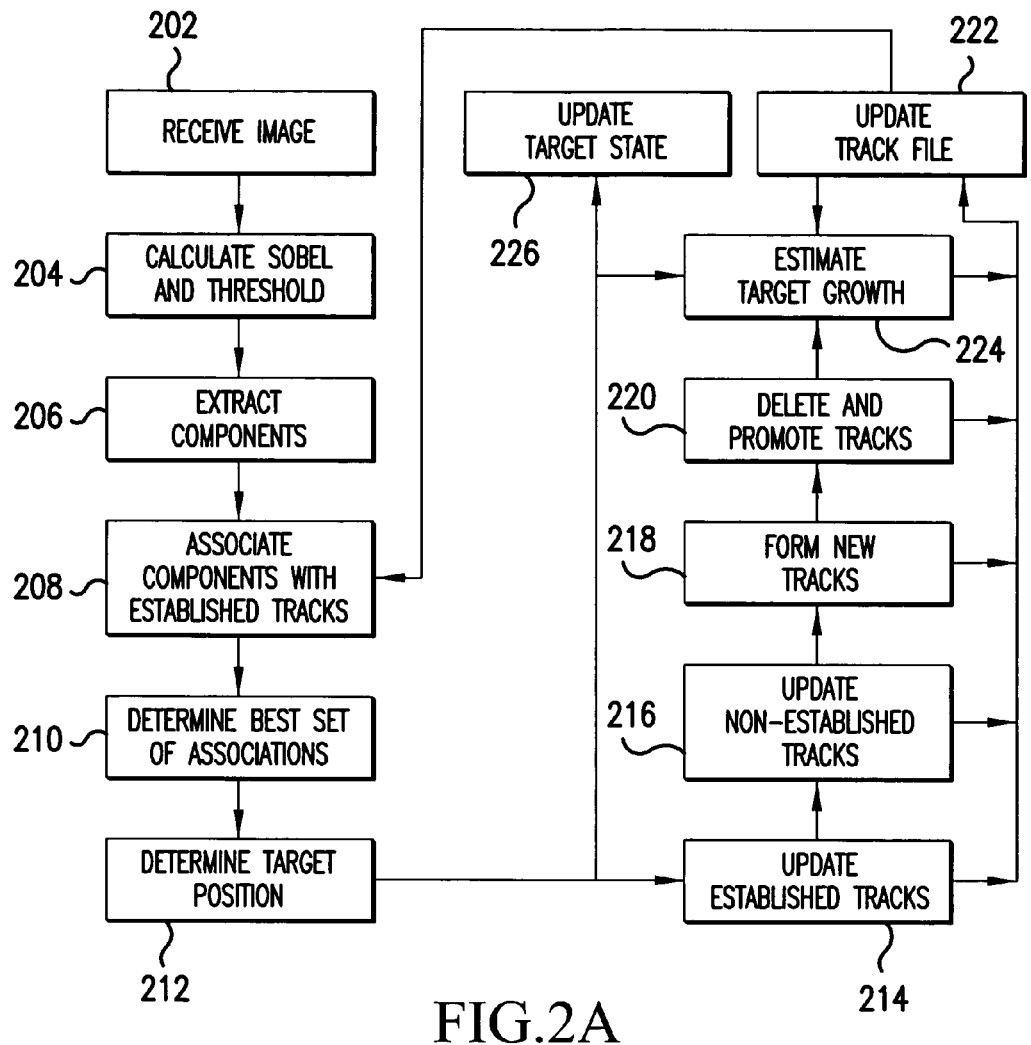
FIG. 2A illustrates a flowchart for associating components for target identification and tracking using a component association tracker according to the embodiments of the present invention.

FIG. 2A is a flowchart for associating components for target identification and tracking using a component association tracker according to the embodiments of the present invention. Preferably, the flowchart of FIG. 2A is implemented by the hardware and software configuration disclosed by FIG. 1. Neither FIG. 1 nor FIG. 2A, however, limits each other in their applicability to the embodiments of the present invention.

Step 202 executes by receiving an image at the component association tracker which may be received from any source. Preferably, the image is received from detectors and/or sensors. Referring back to FIG. 1, image 180 is received at tracker 104 after being generated by detectors 102. Advantageously, detectors 102 may include a plurality of sensors including millimeter-wave (MMW) and/or infrared (IR) sensors. Also, during this step, targets (and clutter) may be designated and target tracks (and established, non-target tracks) may be created as described above.

Step 204 executes by calculating threshold values for the input image received in step 202 using a Sobel edge determination algorithm. Step 204 analyzes groups of connected pixels with the same edge direction that potentially forms each image component within the input image. Using a predetermined threshold, component association tracker 104 determines whether connected pixels have the same edge direction and should be grouped together as a potential image component. Advantageously, the threshold may be set as a percentage of pixels. The edge magnitude may be histogrammed and the threshold may be set such that a certain, predetermined percentage of the pixels will satisfy and pass. For example, the percentage may be initially set to 10%, and can be varied according to processing load and performance considerations. In alternative embodiments, the threshold may be dynamically adjusted on a frame-to-frame basis to account for changing conditions (e.g., weather). Advantageously, the threshold may be dynamically adjusted to keep the number of components between predetermined upper and lower bounds.

Step 206 executes by extracting image components from the received image. Step 206 extracts groups of pixels with the same edge direction to form each component. For example, image 180 may be segmented into a plurality of discrete components, using discrete search windows for each component, after being input to tracker 104. Each component includes a portion of the input image 180. The size of the image portion (subimage) preferably is three times the estimated target size in width and height of image 180, but should also be constrained to a maximum size to limit the processing load on processor 106.

Figure 2B:
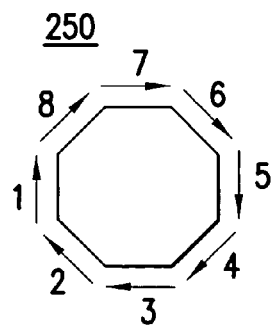
FIG. 2B illustrates plurality of edge directions that may be designated for image components for target identification and tracking using a component association tracker according to the embodiments of the present invention.

The extracted image components may be smoothed using a 3×3 mean filter and then a gradient operator may be applied to the components to produce gradient magnitude and direction. The functions of both smoothing and gradient calculation may be achieved by using a Sobel filter. At each pixel, x and y direction gradient values are produced, dX and dY. The gradient magnitude is calculated as sqrt $(dX^2+dY^2)$ and the direction as arctan(dX/dY). The gradient direction may be then quantized to n discrete edge directions that are sequentially numbered 1 to n. In an exemplary embodiment, the gradient direction may be quantized to eight directions, labeled 1 to 8, illustrated by octagon 250 as shown in FIG. 2B. Further, the eight directions (1 to 8) may be distinguished by color coding (e.g., 1-blue, 8-yellow) during input image 180 processing by tracker 104. The threshold described herein may be applied to the gradient magnitude, and any pixels that are below this threshold have both the gradient magnitude and the direction set to zero.

After the gradient magnitude threshold is applied, image 180 is broken down into the extracted components. As defined above, a component is a group of pixels that has the same non-zero gradient direction and are connected horizontally or vertically within image 180. Components that contain pixels at the edges of the window encompassing the subimage are ignored, because it is likely that the entire component is not being detected. The ignored component preferably is being tracked in another window. The number of pixels in a component also should exceed a threshold, initialized to 1 pixel, that can be adjusted to control processing load on processor 106. Components not meeting this threshold are discarded, thereby preventing processor 106 from performing unnecessary operations and associations. Thus, step 206 extracts components by extracting the essential data required for each component by tracker 104. This data includes, at the least, the edge direction and the x- and y-centroids of the component pixels within image 180.

Step 208 executes by associating the extracted components with established tracks (image component markers). Preferably, step 208 matches the tracks with all nearby components that have the same edge direction. For each established track, tracker 104 finds all the components in a current received frame of image 180 that fall within a search window around the predicted target position having the same edge direction as the established track. Preferably, the position coordinates of every track may be relative to the target center. A search for components within a search window, relative to an established track, may uncover no components or a plurality of components depending on finding a match between the edge direction for the component and the established track within a predetermined distance. These features are disclosed in greater detail with reference to FIGS. 3, 4 and Table 3.

Step 210 executes by determining the best set of associations between established tracks and extracted components from received image 180. In step 210, possible associations are searched to find the "best" global match between tracks and components. The list of possible track/component associations are processed to determine the best set of one-to-one track/component associations. Each track/component association is assigned a value, or "weight," and a set of associations that produces the minimum total weight (the "best" association) is determined. The association processes of the present invention are disclosed in greater detail below with reference to FIGS. 3 and 4.

Step 212 executes by estimating target position for a target or targets, such as targets 188 within image 180. Tracks, whose positions are relative to the target center, are designated as target tracks and are used to update the current target position according to the extracted image components from the input 180. The position and velocity of the target being tracked is updated using the mean position for extracted components, on the current frame of image 180, associated with target tracks. Step 212 also sends the determined (calculated) target position to step 226 to update the target state of that target associated with the track.

Step 214 executes by updating established tracks from track file 116 of tracker 104. Established tracks are updated based on the previously determined track/component associations, as disclosed above. Established tracks are those tracks that have been in existence for a predetermined number of frames of image 180. Step 216 executes by updating non-established tracks within track file 116. Non-established tracks are updated with components that did not associate with established tracks by testing for association with these non-established tracks.

Starting with the oldest tracks, the extracted image components from image 180 are searched for components that fall within a search window outside of previous search windows used for extracting components associated with the target track or established tracks. If any of the components fall within this window, the component closest to a track's predicted position is assigned to that track, and the track data is updated with the non-established track/component association.

Step 218 executes by forming new tracks. New tracks are formed from any unused components left over from the previous steps which did not associated with target, established, or non-established tracks. The component position relative to a target and the component edge direction are copied to the new track, the velocity is set to zero, and all counters and flags are set to initial values. The component edge direction that is copied to the new track becomes the edge direction for the new track and remains for the life of the track. Preferably, the new track may only be updated by associating components having the same edge direction. Thus, all extracted components are accounted for by association with either established or non-established tracks, or the extracted components are used to form new tracks. All of these actions result in an update to track file 116 on tracker 104.

Step 220 executes by deleting and promoting tracks. Tracks that have been in existence for a predetermined number of frames will be either set to "established" (promoted) or deleted from the track file 116. In step 220, newly established tracks are promoted and marked as target or clutter. Step 220 also may be known as "track file maintenance" that updates the state of the tracks in track file 116. After track-component association initially occurs, a count is maintained of the total number of times a track is associated with a component. If this count exceeds a threshold, the track is set to "established" as disclosed above. Otherwise, the track is deleted from track file 116. Newly established tracks that fall within the target region and do not have significant motion relative to the target center are designated as "target tracks".

Step 220 may also delete tracks that no longer correlate to components within image 180. A track is deleted if it "coasts" which is defined as not associating with a component for a predetermined amount of time after initial track creation/association during receiving of updated images 180. For determining whether a track should be deleted, each time a track associates to an extracted component, a counter is incremented until a predetermined maximum value is reached, as disclosed above. Each time the track does not associate to an extracted component ("coasting"), the counter is decremented. When the counter reaches zero, after being decremented due to non-associating ("coasting"), the track is deleted from track file 116.

Step 222 executes by updating track file 116 in accordance with the results of steps 214, 216, 218, and 220.

Updating track file 116 includes promoting tracks to established tracks and accounting for new tracks formed by unassociated, extracted components. In addition, deleted tracks are removed from track file 116. Updated track file 116 is available for further processing when step 208 is repeated in response to an updated image 180 being received by tracker 104. This feature allows for newly established tracks to be accounted for in associating extracted components in subsequently received images.

Step 224 executes by estimating target growth. The comparison of the initial, predicted position of the target from step 202 and the updated target position from step 212 generates target growth. Step 224 receives the updated target track, as well as the existing target state. From steps 212, 214, the target position may be determined and provided to a user or other entity via display/output 130. Promoted tracks identified as target or clutter (non-target, established tracks initially designated in step 202) may also be considered in updating target position.

Figure 3:
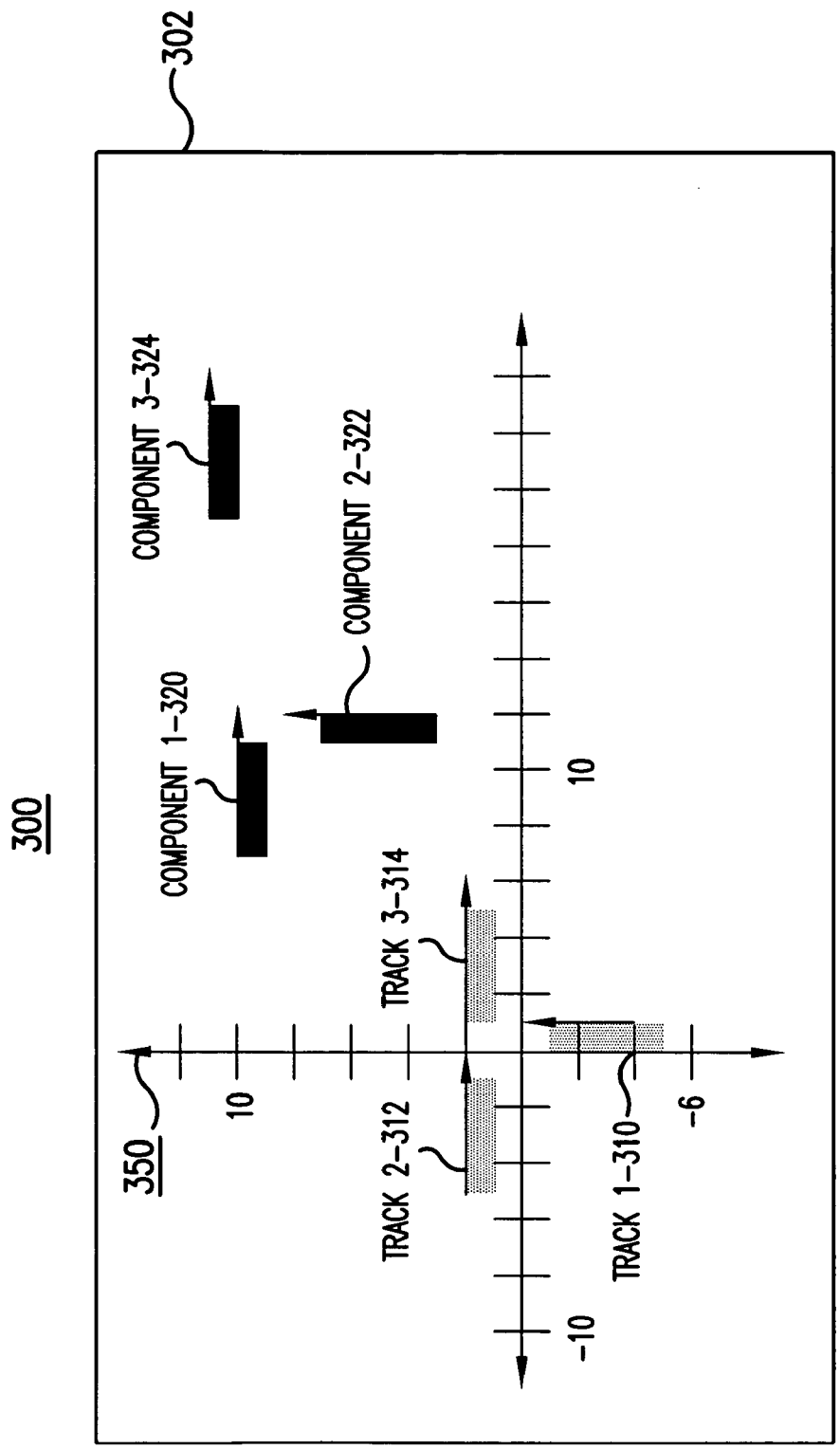
FIG. 3 illustrates tracks and components in a current frame of an image according to embodiments of the present invention.

FIG. 3 depicts tracks and components in a current frame of an image according to the present invention. FIG. 3 shows image frame 300 of a received image, such as image 180 of FIG. 1. Search window 302 is identified in frame 300. Frame 300 can include additional search windows and is not limited to search window 302. Search window 302 is shown for the sake of brevity and ease of explanation. Search window 302 corresponds to a target identified within frame 300.

Search window 302 surrounds tracks and components that may, or may not, correspond to that target. Preferably, window 302 has a rectangular shape. Search window 302 is a portion of the input image that is extracted around a predicted target location. Preferably, the size of window 302 is three times the estimated target size. The size, however, of window 302 can be constrained due to processing requirements and limits to any specified parameter, such as width, height, radius, and the like.

Referring to FIG. 3, tracks 310, 312, and 314 are within window 302. Components 320, 322, and 324 also are within window 302. Tracks 310, 312, and 314 are known as tracks 1, 2, and 3, respectively. Components 320, 322, and 324 are known as components 1, 2, and 3, respectively. Window 302, in alternative embodiments, can have additional tracks and components, less tracks and components, or even no tracks and components. Window 302 of the present invention is not limited by the tracks and components depicted in FIG. 3.

Tracks 310, 312, and 314 can be established or non-established tracks. For example, tracks 310 and 312 can be established tracks, while track 314 is a non-established track. Components 320, 322, and 324 are then associated with the tracks, as disclosed above. For example, components 320, 322, and 324 are within the search window of existing tracks 310, 312, and 314. A list is compiled of possible track-to-component associations via processing to determine the best set of one-to-one track-to-component associations. Further, the possible directions of components 320, 322, and 324 are determined when they are extracted. A possible direction is determined by analyzing the pixels within the component. Tracks 310, 312, and 314 also have directions. The associating process is disclosed in greater detail with reference to FIG. 4 below which takes into account the edge direction and position for each track and component to determine potential association pairs.

Figure 4:
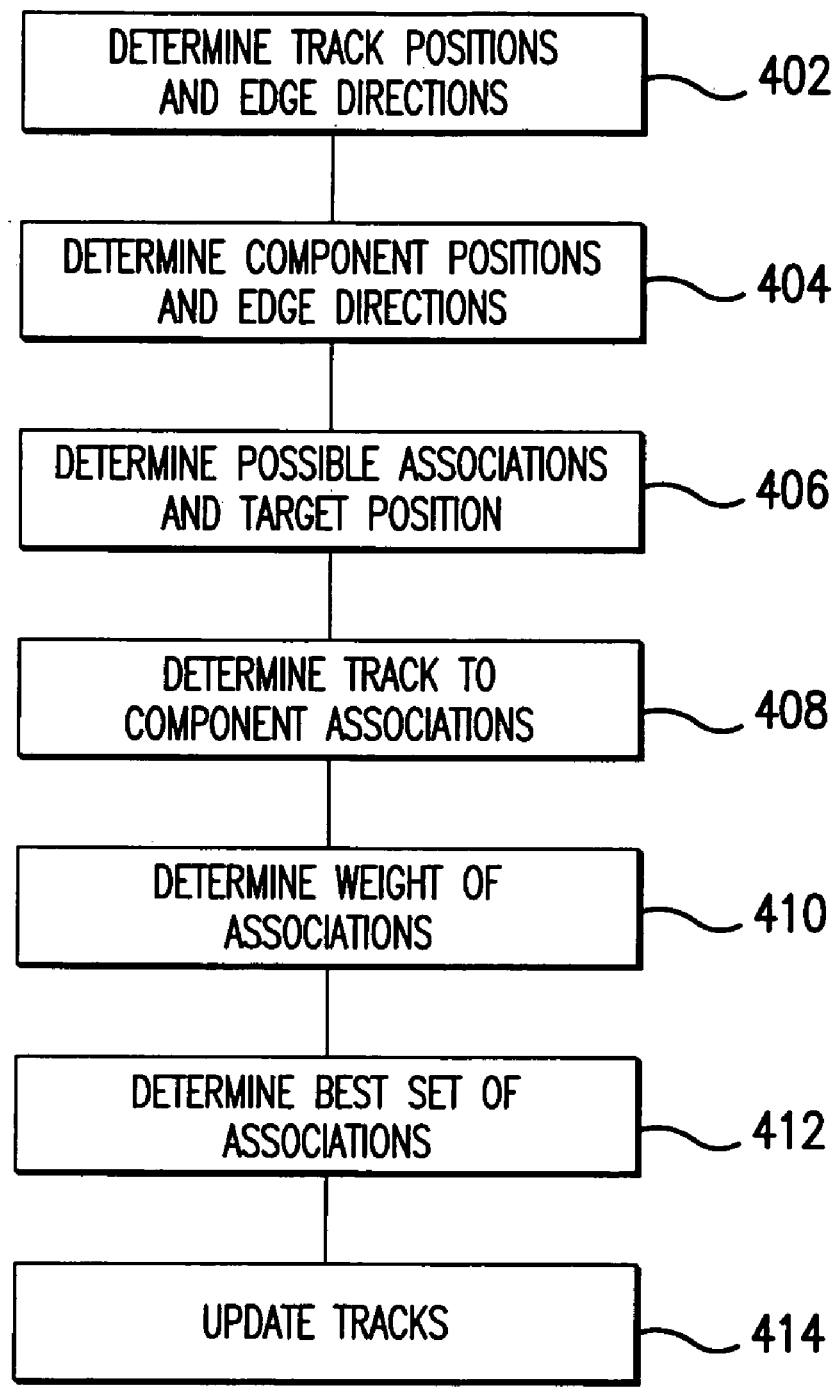
FIG. 4 illustrates a flowchart for associating tracks and components according to embodiments of the present invention.

FIG. 4 depicts a flowchart for associating tracks and components according to embodiments of the present invention. FIG. 4 describes exemplary steps 206, 208, 210, 212, 214, 216, and 218 of FIG. 2A in more detail but these analogous steps of FIG. 2A are not limited by the disclosure of FIG. 4.

After receiving the input image 180 at step 202 of FIG. 2A, step 402 may execute by determining current track positions and edge directions based on prior track history as previously described using either linear prediction for non-target tracks or calculation of target track position relative to current target center position. Alternatively, if the input image is received at target and track initialization, as previously described image components are extracted from the input image 180 in response to user selection to create initial target and non-target tracks.

Referring to FIG. 3, the track positions and edge directions of tracks 310, 312, and 314 are determined within window 302 using an exemplary coordinate system 350. The track position may be determined by predicting the current position of the track based on its previous position and velocity where the positions are relative to the center of the target. The edge direction of the track may be a fixed value determined by the edge direction of the component which initially formed the track as previously described during track initialization or as performed in step 218. Tracks 310, 312, and 314 are within a specified distance of the predicted target location as initially designated in step 202 or updated in step 212. The track file, such as track file 116, stores the tracks. Advantageously, every track has a position and edge direction that are determined by the components which formed the track in prior frames. Preferably, the edge direction is given as one of eight directions, as shown in FIG. 2B, and may be relative to an x-y coordinate axis as shown in FIG. 3 for each track and component illustrated. The directions shown in FIG. 2B are solely exemplary as in an exemplary embodiment, Direction 1 may be "up" or when x=0 and y<0 in reference to an x-y coordinate system as shown in FIG. 3. For example, Table 1 below lists the tracks with their positions and edge directions:

TABLE 1

| TRK | POS | DIR |
|---|---|---|
| 1 | 0.5, −3 | 1 |
| 2 | −3, 1 | 7 |
| 3 | 3, 1 | 7 |

Referring to track 1, which corresponds to track 310 in FIG. 3, it is determined that it has a direction of 1 (up) and a position of 0.5, −3 on the x-y-coordinate axis.

Step 404, analogous to step 206, executes by determining the component positions and edge directions, such as components 320, 322, and 324 within window 302 of FIG. 3 for extracted image components from received image 180. The component positions may be in a sensor coordinate frame using sensors in detectors 102 which are preferably x and y pixel locations within an image. The component edge directions are the quantized gradient directions calculated in step 206. The components are extracted from the image of current frame 300, for example, of FIG. 3. Table 2 below shows the component positions and edge directions:

TABLE 2

| COMP | POS | DIR |
|---|---|---|
| 1 | 9, 8.5 | 7 |
| 2 | 11.5, 5 | 1 |
| 3 | 21, 10 | 7 |

Steps 406, 408, 410 may be preferably executed within steps 208, 210 of FIG. 2A. For an exemplary embodiment, step 406 executes by determining possible track-component associations and the target position that would be derived from each association. Possible track-component associations are determined from the track and component list which list the positions and directions for each track and component as shown in Tables 1 and 2. For example, all the possible associations of tracks 310, 312, and 314 and components 320, 322, and 324 shown in FIG. 3 may be determined by associating tracks and components with the same edge direction and within a predetermined distance of each other. Further, the target position is calculated that is implied by each track-component association. Since each track position is relative to the target center, and the component position is in received image coordinates, the track-component combination gives a potential location for the target in image coordinates. In accordance with user criteria, the target may be within a rectangular region including the component associated with a track. Based on the position and velocity of the track and component, an estimation may be made for the target position as shown in Table 3. For example, as shown in Table 3, the potential target position (center) may be 11,8 for track 1/component 2 association (component 2 located at 11.5, 5) since the target is predicted to fall within a rectangular region encompassing component 2 and is moving in an upward direction.

The potential target position listed in Table 3 is measured in absolute value (x, y) coordinate distance away from the track position as the target track has a fixed position relative to the target center, normalized to the target size. For example for the track 1/component 2 pair, track 1 is located at (0.5, −3) as indicated in Table 1 and component 2 is located at (11.5, 5) as indicated in Table 2. Therefore, the potential target position lies an absolute value (x, y) distance away of (|11.5−0.5|, |5−(−3)|) equaling (11, 8) distance away. Table 3 below shows the possible track-component combinations and target positions of the tracks listed in Table 1 and the components listed in Table 2:

TABLE 3

| TRK | COMP | POTENTIAL TGT POS DIST (in abs [X, Y] coord) |
|---|---|---|
| 1 | 2 | 11, 8 |
| 2 | 1 | 12, 7.5 |
| 2 | 3 | 24, 9 |
| 3 | 1 | 6, 7.5 |
| 3 | 3 | 18, 9 |

Step 408 may execute by determining track-to-component associations based on the possible associations determined above. Possible track-to-component associations are processed to determine one-to-one track-to-component associations. Each track-to-component association is assigned a value, or weight, and the set of associations that produces the minimum total weight is determined, as described below and identified in Table 4. The total weight calculated represents the total degree of closeness to the determined target position in search window 302 for each set of track/component associations.

Step 410 may execute by determining the weight of these associations. For each set of associations, each track can only associate with one distinct component within a predetermined distance and having the same edge direction, or else a track may not associate with a component (indicated by a "-" in Table 4) indicating that the track is the furthest distance away from the mean target position determination in search window 302. For this example, track 1 may only associate with component 2 since they have the same edge direction (1) or else not associate with a component giving track 1 only two association possibilities. Alternatively, both track 2 and track 3 have three association possibilities since both of these tracks may associate with either component 1 or component 3 since they have the same edge direction (7). However, the total number of track 2/track 3 association pairs becomes ($3^2$−3) equaling 6 since you want to subtract the association pairs (2) with the same component association since this cannot occur (track 2 and track 3 cannot both associate with either component 1 or 3) since a component may only associate with only one track and you also subtract the association pair where both tracks do not associate (-, -) since this is non-useful data for the target tracking. Therefore, the number of track 2/track 3 association pairs (6) is multiplied by 2 (the number of track 1 association possibilities) providing a total number of twelve (12) sets of track 1/track 2/track 3-to-component associations.

The weight for each track-to-component pair is the squared Euclidian distance between the estimated target position for that pair (as identified in Table 3) and the mean target position estimate corresponding to the predicted target location given above. If a track does not have an associated component, indicated by a dash (-) in Table 4, a fixed maximum weight is used to indicate that this track is the furthest distance away from the mean target position determination in search window 302. Preferably, the fixed maximum weight is the lowest weight (indicating the track the furthest distance away from the target position in window 302) for a component that would fall outside the track-component association window 302 (e.g., target window) used for step 406.

For example, a track within window 302 of FIG. 3 may not have a component associated to that track. The track may not be near an extracted component, or the track may be along the edge of window 302. In this instance, a fixed maximum weight (indicating a distant component—outside of window 302) can be used in order to provide a track-to-component association weight. Table 4 below shows some of the possible combinations and the total weight associated with those combinations according to the example given above. These combinations and weights correspond to the track and component combinations shown in FIG. 3 and Table 3.

In the first row of the table there is only one track-component pair, track 3/component 1, so the target position of this pair is equal to the mean target position for that row, and the contribution to the weight for this pair is therefore 0. There is no distance away for this pair since the target coordinates for this track-component pair are the exact coordinates for the mean target position estimate. Tracks 1 and 2 have no component association so they each receive the unassociated weight (fixed maximum weight), which is 8 in this example. This gives a total weight of 16 to row 1. In row 4 both tracks 2 and 3 have associations and referencing table 3, the potential target positions for these pairs are (12, 7.5) and (18, 9). The mean target position is calculated as (15, 8.25). Taking the squared distance of the potential target positions from the mean gives ($3^2$+$0.75^2$)+($3^2$+$0.75^2$), or 19.125. Adding the unassociated weight for track 1 gives a total weight of 27.125. All the weights must be added to come up with a total degree of closeness to the target for the row of track/component associations.

TABLE 4

| TRK 1 COMP | TRK 2 COMP | TRK 3 COMP | WGT |
|---|---|---|---|
| — | — | 1 | 16 |
| — | — | 3 | 16 |
| — | 1 | — | 16 |
| — | 1 | 3 | 27.125 |
| — | 3 | — | 16 |
| — | 3 | 1 | 171.125 |
| 2 | — | — | 16 |
| 2 | — | 1 | 20.625 |
| 2 | — | 3 | 33 |
| 2 | 1 | — | 8.625 |
| 2 | 1 | 3 | 29.832 |
| 2 | 3 | — | 93 |

Step 412 may execute by determining the best set of associations for the track-to-component associations. Preferably, the set of associations that produces the minimum total weight is the best set. For example, referring back to Table 4, the minimum total weight within Table 4 is the weight value of 8.625. This row contains the best set of associations indicating the closest track/component associations to the target position in search window 302. The target position estimate for this row comes to 11.5, 7.75 by taking the mean average of the potential target positions for track 1/component 2 association (11, 8) and track 2/component 1 association (12, 7.5). In accordance with the target position calculation, the target is assumed to cover the rectangular region of search window 302 where the size of this region is determined by the initial target range and size as selected by the user, and the current estimate of the target range as determined by the track/component association and related absolute value (x, y) distance away as shown in Table 3.

Preferably, a suboptimal search algorithm is used in determining the weights and the best set of associations. The suboptimal search algorithm is used in order to reduce computation time, although an exhaustive search of all combinations yields optimal results. The suboptimal search algorithm reduces processing requirements from tracker 104, for example. Referring again to Table 4, according to the best set, track 1 is associated with component 2, track 2 is associated with component 1, and track 3 is not associated with any component. Further, track 3 can be indicated as coasting as no component is associated with track 3. Also, when a component is not associated with a track, this component may be used to establish a new track in accordance with step 218.

Step 414, analogous to steps 214, 216, may execute by updating tracks in track file 116 with new component-to-track associations including indicating the updated track position and velocity from the completed target position determination from step 412. The track position and velocity may be updated since all tracks are positioned relative to the target center as previously described. Tracks not associated with a component are "coasted" for that frame as described above. Also, the position and velocity of the target being tracked is updated using the best track/component association(s) from step 412 to determine the target position (which may be reported for a user).

In accordance with the disclosed embodiments described herein, tracker 104 provides a plurality of advantages including increased clutter suppression within image 180. Tracking a plurality of objects within the received image 180 in addition to the target object 188 reduces target detection error of confusing the target 188 with surrounding clutter or other adjacent targets. Also, tracking multiple points on the target object (via the extracted components) enables accurate target tracking during partial obscuring of the target.

Additionally, tracker 104, according to embodiments of the present invention, includes the ability to measure target growth and eliminates the need for range input because of dynamic target tracking. Tracker 104 also establishes the tolerance of moderate roll distortions generated by motion between targets 188 and detectors 102 in tracking targets 188 using the components identified from image 180.

Further advantages include referencing the distance calculation to the mean target position estimate allowing the disclosed embodiments of the present invention to account for a global shift in the received image, such as image 180. Also, because of motion within missiles and other airborne devices, the disclosed embodiments of the present invention proceed as if there is an inaccurate inertial reference.

It will be apparent to those skilled in the art that various modifications and variations that can be made without departing from the scope or spirit of the invention. Thus, it is intended that the present invention covers the modifications and variations of the disclosed embodiments provided that they come within the scope of the following claims and their equivalents.

What is claimed:

1. A method for tracking a target, comprising:
   receiving an input image including a target having a target position;
   determining components in a window of the image according to an edge direction of connected pixels, the window being associated with the target position;
   for all determined components in the window, determining possible track-to-component associations and the target position that would be derived from each association using tracks in a track file;
   assigning a weight to each track-to-component association in the window;
   determining a best set of track-to-component associations in the window and using this to determine current target position; and
   updating the tracks in the track file based on the determined current target position.

2. The method of claim 1, wherein said determining components in the window is based on said connected pixels satisfying a predetermined threshold.

3. The method of claim 1, wherein said updating the tracks in the track file includes determining velocity of the target.

4. The method of claim 1, wherein
   updating the tracks in the track file includes
   setting any track to an established track when a predetermined threshold is satisfied, and
   deleting said any track when said predetermined threshold is not satisfied.

5. The method of claim 4, wherein setting said any track to an established track occurs when a number of times said any track is associated with a component exceeds a first threshold in a time period, and deleting said any track when the number of times said any track is associated with a components does not exceed a second threshold in the time period.

6. The method of claim 1, wherein said updating the tracks includes deleting a track if there is failure to associate the track with a component for a predetermined amount of time in determining possible track-to-component associations.

7. The method of claim 1, further comprising:
generating a track to associate with a component when there is failure to associate the component with a track in the track file in determining possible track-to-component associations.

8. A device for tracking a target, comprising:
a processor for receiving an input image including the target having a target position; and
a track file including a plurality of predetermined tracks, wherein said processor
determines components in a window of the image according to an edge direction of connected pixels, the window being associated with the target position;
for all determined components in the window, determines possible track-to-component associations and the target position that would be derived from each association using tracks in a track file;
assigns a weight to each track-to-component association in the window;
determines a best set of track-to-component associations in the window and using this to determine current target position; and
updates the tracks in the track file based on the determined current target position.

9. The device of claim 8, further comprising a memory to store instructions accessible by the processor.

10. A computer program product comprising a recording medium having stored thereon a computer readable program executable by a computer for tracking a target by carrying out:
receiving an input image including a target having a target position;
determining components in a window of the image according to an edge direction of connected pixels, the window being associated with the target position;
for all determined components in the window, determining possible track-to-component associations and the target position that would be derived from each association using tracks in a track file;
assigning a weight to each track-to-component association in the window;
determining a best set of track-to-component associations in the window and using this to determine current target position; and
updating the tracks in the track file based on the determined current target position.

11. A method for tracking a target, comprising:
receiving an input image including a target having a target position;
determining a plurality of components in the image according to an edge direction of connected pixels within the component;
associating the plurality of components with a plurality of predetermined tracks based on the edge direction of said component, to generate a plurality of sets of track-to-component associations, wherein at least one track is associated with the target position and each component is associated with no more than one track in a set;
assigning a weight to each track-to-component association in a set based on the distance between each track and associated component as related to the target position;
determining the best set of track-to-component associations based on the total weight, calculated by adding the assigned weight for each track-to-component association in the set, for one of the sets summing up to a minimum value, wherein the best set determines the current target position.

12. The method of claim 11, wherein said associating includes generating at least one set of track-to-component associations wherein at least one track in the set fails to associate with a component.

* * * * *